June 30, 1942.   E. P. GAILMARD ET AL   2,288,082
DICTATION MACHINE CONTROL MEANS
Original Filed Nov. 20, 1936    5 Sheets-Sheet 5
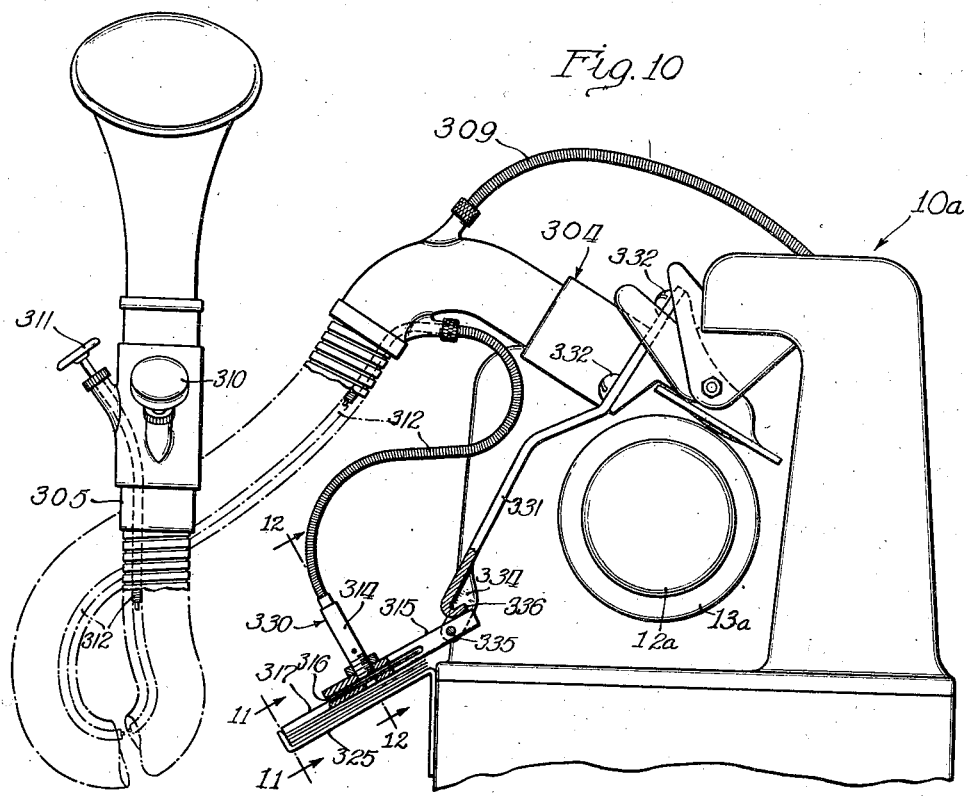
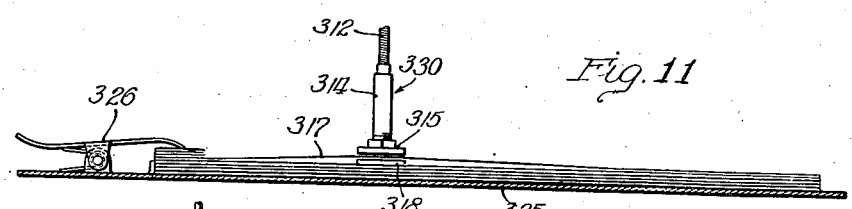
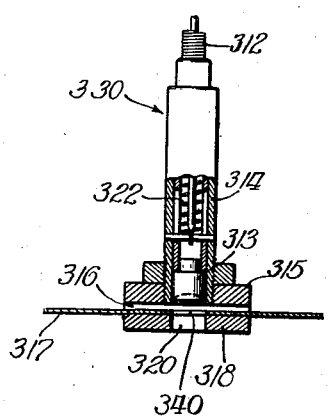
INVENTORS
Eugene P. Gailmard
Roger C. Johnson
BY
Roger C. Johnson
ATTORNEY.

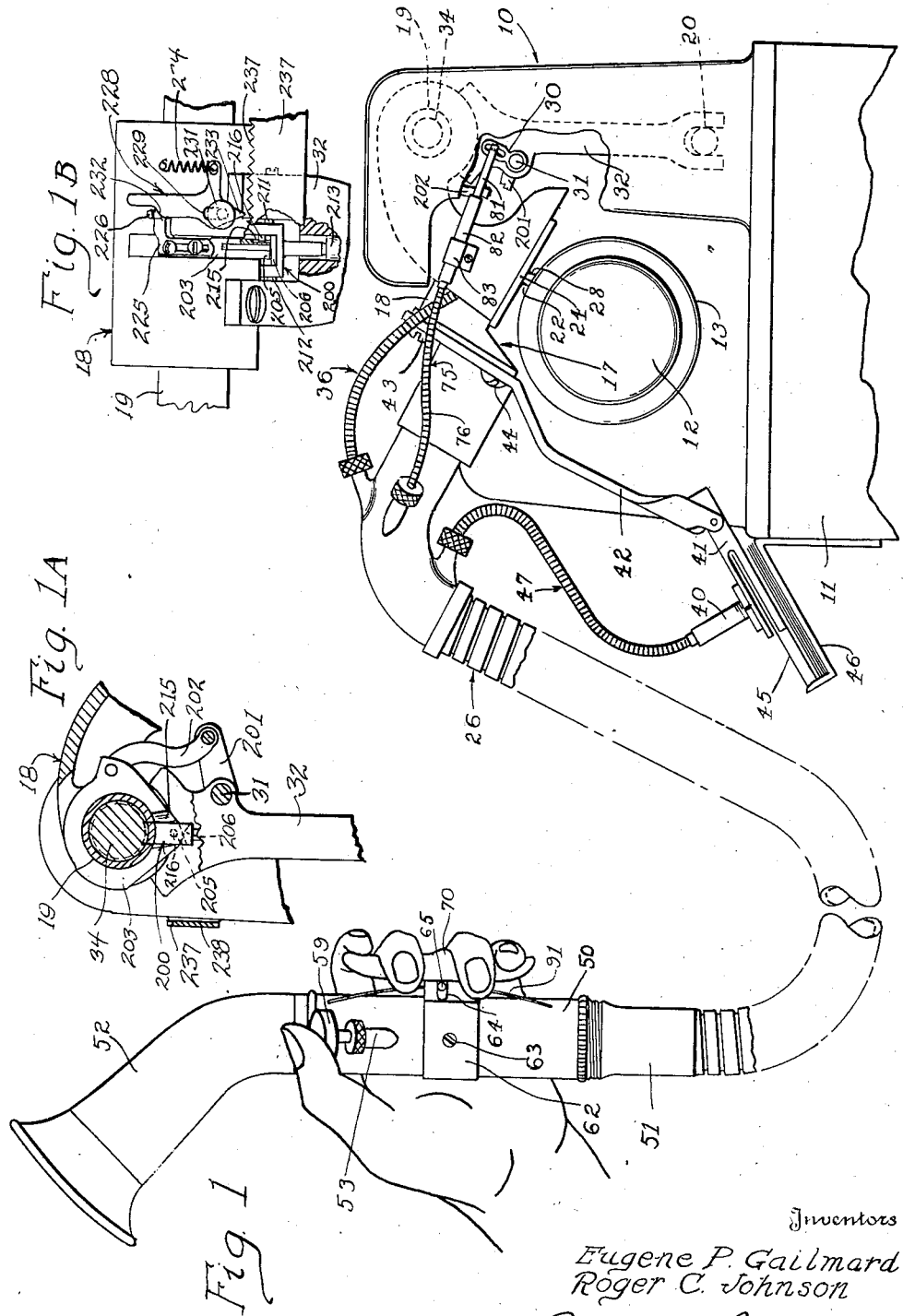

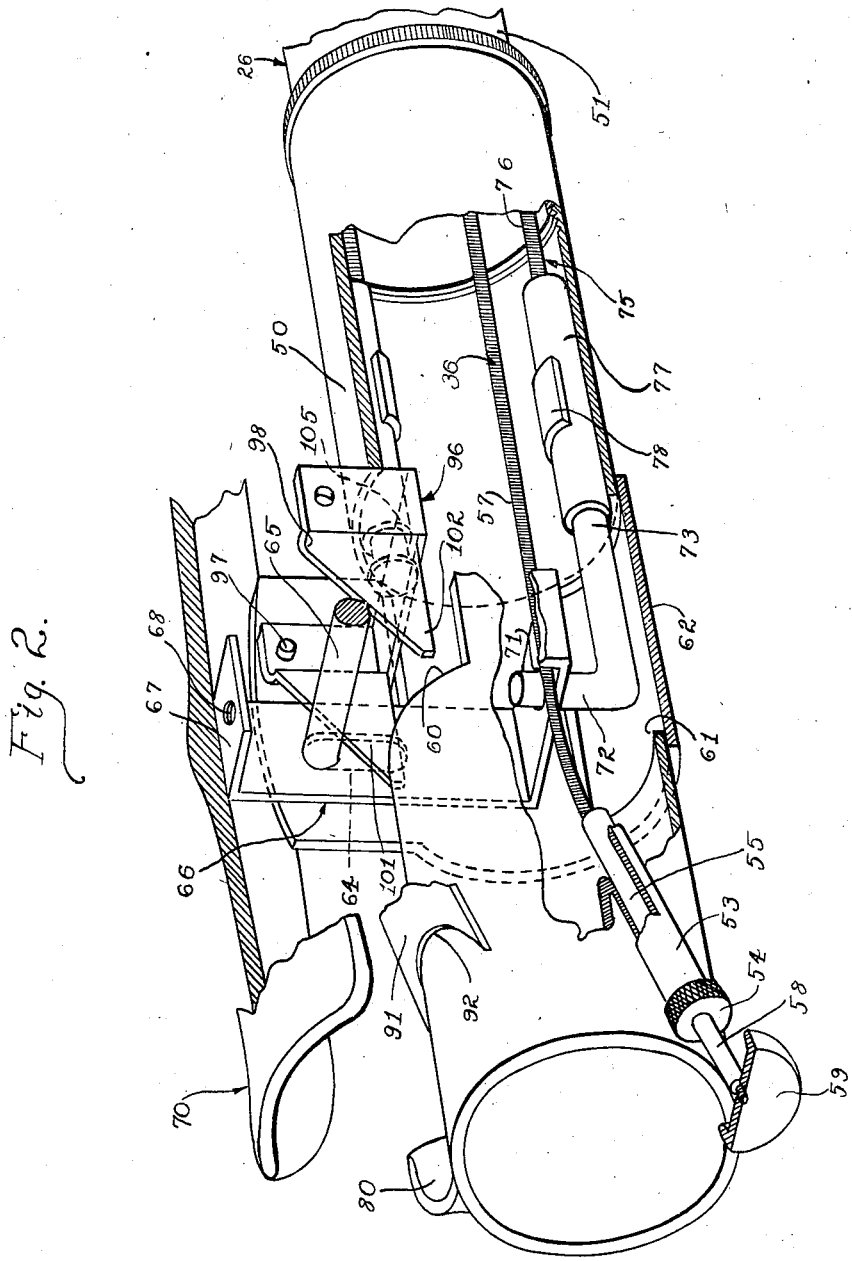

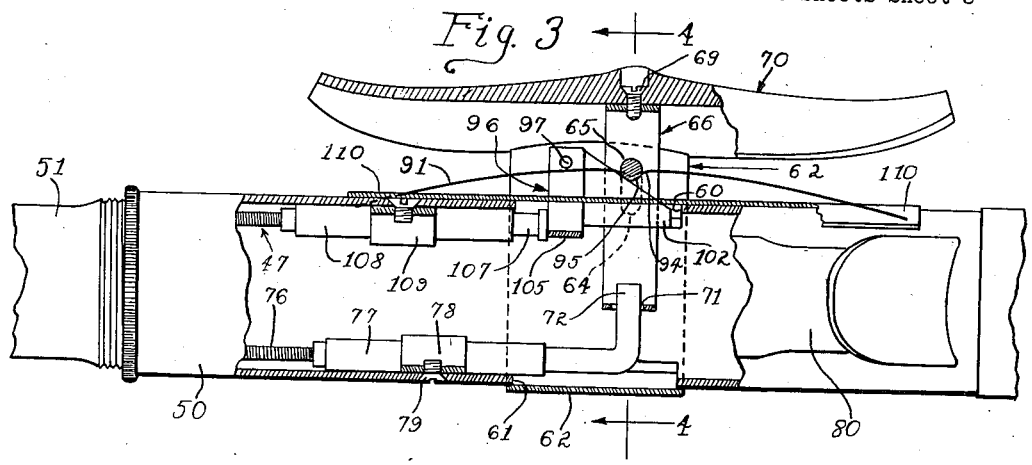
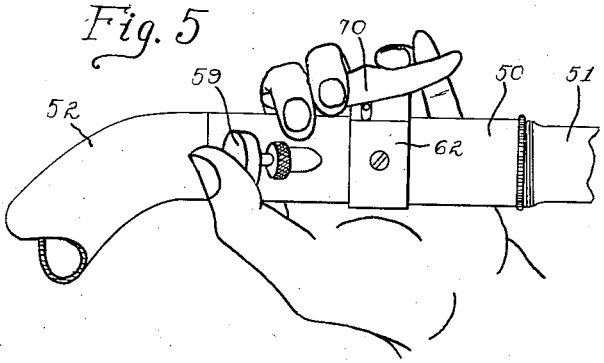
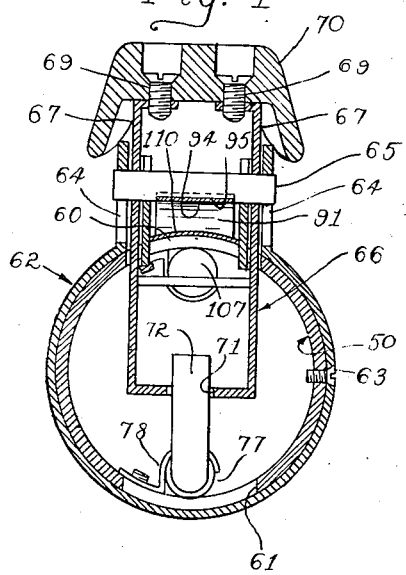
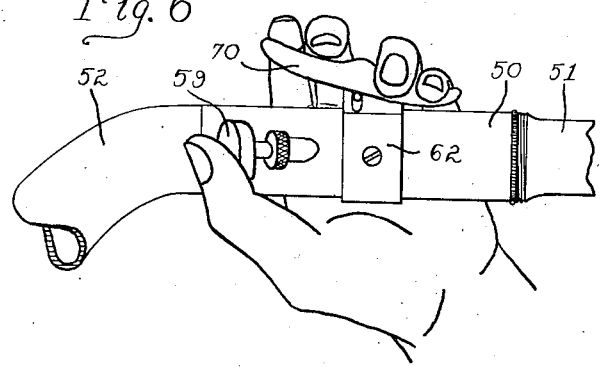
Inventors:
Eugene P Gailmard
Roger C. Johnson June 30, 1942.                E. P. GAILMARD ET AL                2,288,082
                            DICTATION MACHINE CONTROL MEANS
                    Original Filed Nov. 20, 1936        5 Sheets-Sheet 4
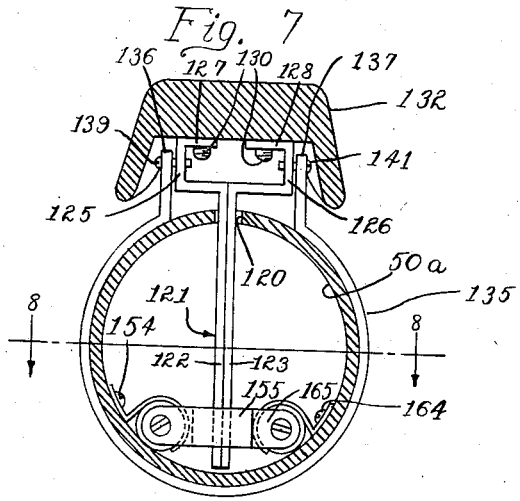
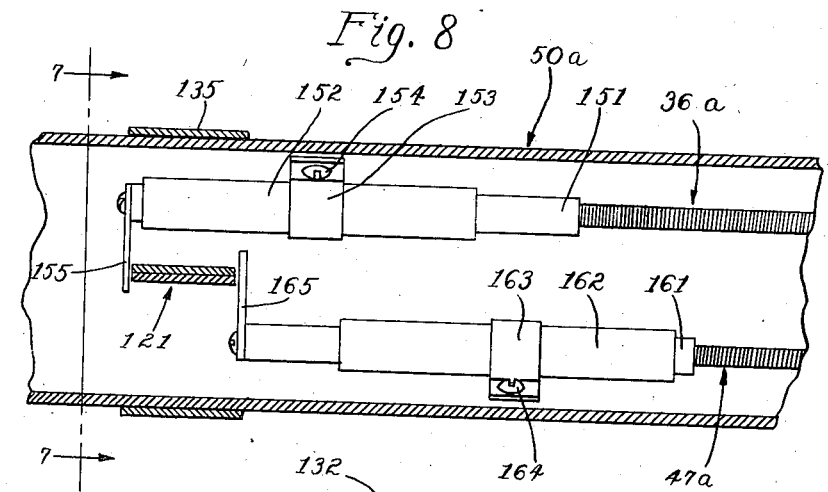
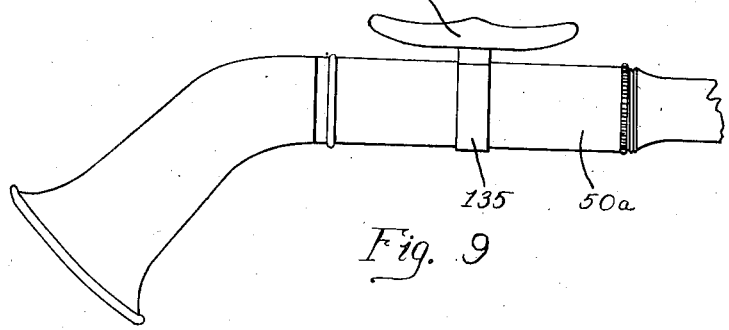
Inventors
Eugene P. Gailmard
Roger C. Johnson
By: Roger C. Johnson Atty.

Patented June 30, 1942

2,288,082

UNITED STATES PATENT OFFICE 2,288,082

DICTATION MACHINE CONTROL MEANS

Eugene P. Gailmard, Chicago, and Roger C. Johnson, Moline, Ill.

Division of application November 20, 1936, Serial No. 111,829, now Patent No. 2,265,034, dated December 2, 1941. Continuation of application September 3, 1938, Serial No. 228,410. Divided and this application May 10, 1941, Serial No. 392,884

20 Claims. (Cl. 274—17)

This application is a division of our copending application, Serial No. 111,829, filed November 20, 1936, and a continuation of our copending application, Serial No. 228,410, filed September 3, 1938.

This invention relates generally to dictaphones, or dictation recording machines, and more particularly to devices for controlling such machines in their operation and usage.

The use of present day equipment for the recording of dictation involves a number of steps or operations requiring bodily movement or change of posture, manual adjustment and positioning of parts of the machine, and more or less frequent interruption of both the thought trend and the flow of dictation in order to accomplish such adjustments, all of which combine to afford a source of irritation and annoyance to the person dictating, to say nothing of the loss of time occasioned thereby.

Such dictation recording machines are usually provided with a mandrel to receive a cylinder upon which the dictation is recorded and are equipped with suitable means to control the starting and stopping of revolution of the mandrel, together with suitable means for recording dictation on the cylinder. Also, such machines include a voice or sound-collecting tube which is adapted to be held in the hand of the person dictating, at a distance of arm's length or more from the recording machine proper, and operatively connected to the recording machine mechanisms by means disposed in a flexible cable. A push button or other means is positioned on the handle or hand grip of the voice tube to control the starting and stopping of the mandrel on the machine proper.

Heretofore, the recording unit has included some means for moving the diaphragm of the sound box into and out of listening and recording positions, whereby the dictator is enabled to go back and listen to the matter that has been recorded. Generally, such means take the form of a small lever mounted on the shiftable carriage of the sound box unit and connected with the diaphragm and with carriage advancing means usually in the form of a rotatable screw, for advancing the sound box along the cylinder, so that the lever may be moved into a neutral position in which the carriage or sound box will be disconnected from the advancing means, the lever also being movable out of its neutral position into listening and recording positions, mechanism being provided whereby, at the same time, the carriage is moved backwardly and forwardly, respectively, a distance equal to several words on the record cylinder. Thus, by actuating the mandrel, by means of the clutch button on the voice tube, the dictator may record dictation; thereafter, by manually moving the lever on the carriage into neutral position and shifting the carriage backwardly, then moving the lever rearwardly into "listening" position, he may listen, through the voice tube, to the matter already recorded.

Generally, the reason the dictator desires to go back and listen to matter already recorded is to make some change or introduce new matter to be inserted at some point in that which has already been recorded, or to correct some error which he believes has been made in the matter dictated. In order that the transcribing operator may know where such changes or corrections are to be made in the dictation it is necessary that an index of some kind, correlated to the dictated matter, be made on a correction indicator or index slip. Such changes are usually indicated on a record slip which is supported on the dictating machine in a predetermined relation to the record cylinder, and a pointer or other device movable with the carriage of the recording machine enables the dictator to make or mark an index on the slip at a point corresponding to that point in the dictation where he wishes to introduce the change or correction.

The disposition of the lever or other means associated with the sound box advancing means, as heretofore employed in the art, is subject to a number of disadvantages. Usually, the dictator sits at a desk facing his work, with the recording machine at one side thereof on a suitable supporting stand or, in any event, even if the machine is positioned on his desk, it is at arm's length or more from his sitting position. If he makes an error, or wants to introduce any change into the matter already dictated, it is necessary for him to reach over to the dictating machine, (turning away from his desk, if the machine is positioned alongside of him), move the lever into its neutral position, shift the carriage backwardly to approximately the point desired, and then move the lever into a listening position. Upon locating the point where the correction or change is to be inserted, he is further required to make an index on the indicator slip, either as by picking up a pencil and marking the slip, or by actuating some form of stylus or other device carried on the machine as a part thereof. The making of these indices is another operation requiring the attention of the dictator and a change of bodily position. After making such index the lever must be shifted into neutral position, the sound box carriage advanced to the point on the cylinder where dictation was discontinued, and the lever again shifted into recording positon, before dictation may be resumed.

As previously stated, each and all of these various manipulations entail bodily movement and manual operations, require the dictator to turn away from his work or otherwise change his posture, interrupt his trend of thought and flow of dictation, and consume an appreciable amount of time.

The present invention has for its object and general purpose the provision of means making it possible for the dictator not only to control the mandrel, but the movement of the sound box and the adjustment of the latter for listening and recording, and the provision of remotely controlled means on the voice tube for indexing the record slip so as to indicate changes, corrections or insertions to be made at any particular point in the recorded matter, all without turning away from his work, changing bodily posture, or reaching over to the machine proper, thereby eliminating the disturbing interruptions and manual operations above mentioned.

It is particularly an object of the present invention to provide such indexing or marking means, operative conveniently and easily by the dictator, without interruption of his trend of thought or flow of dictation. Heretofore it has been necessary for the dictator to make such indications manually on the indicator slip, as by pencil check marks, or some other means. Such manual operation obviously necessitates the cessation of dictation, interruption of thought trend, and repeated movement or shifting of the hands, arms, or body posture, resulting in considerable inconvenience and loss of time to the dictator.

Particularly, one feature of this invention is the provision of means on the recorder, or dictating machine, whereby, upon operating a button or other part mounted in a convenient place, as on the handle of the speaking tube, a hole or notch will be punched in the paper scale or index slip, indicating that a correction or insertion is desired at that point.

Another important feature of this invention is the provision of a lever mounted on the handle portion of the voice tube and arranged, first, to shift the sound box lever into its neutral, listening, or recording positions and, second, to actuate an indexing device. Another feature of this invention is the disposition of such control lever relative to the part of the voice tube that controls the mandrel clutch, so that the mandrel, sound box control, and indexing means can be selectively actuated by the fingers and thumb of the one hand holding the voice tube.

Particularly it is a feature of this invention to provide a lever arranged for swinging movements in opposite directions from a neutral position and also bodily shiftable, with suitable connections whereby the bodily shifting or transitional movement of the lever actuates the indexing device on a dictation recording machine, and swinging or pivotal movement of the lever causes movement of the sound box control lever from its neutral position into either listening or recording position. Thus the dictator, by means positioned at his finger tips on the handle of the voice tube, and at arm's length or more from his recording machine, is enabled to move the sound box carriage along the cylinder either backwardly or forwardly, as desired, simply by repeated manipulation of the finger lever. Specifically, by continued movement of the lever from its neutral position into recording position, the sound box or carriage can be advanced, and by repeatedly moving the lever from its neutral position into a listening position the sound box or carriage is back spaced, as desired. Movement of the lever in a vertical direction, i. e., bodily depressing it directly toward the voice tube, actuates the indexing mechanism. All of these operations may be accomplished with ease and facility by the fingers of the hand holding the voice tube, leaving the thumb free for operation of the mandrel clutch button, as in present practice.

A further feature of this invention is the provision of a combined mandrel clutch and index control.

These and other objects and advantages of the present invention will be apparent from a consideration of the following detailed description of the preferred structural embodiment, taken in connection with the accompanying drawings, in which:

Figure 1 is a side view of a dictation recording machine in which the principles of the present invention have been incorporated;

Figures 1A and 1B are detail views of the carriage advancing and back-spacing means;

Figure 2 is a perspective view and Figure 3 is a side view of the handle end of the voice tube, partly in section, showing the control parts;

Figure 4 is a section taken along the line 4—4 of Figure 3;

Figures 5 and 6 are small views showing different positions of the carriage and styli controlling lever;

Figure 7 is a sectional view, similar to Figure 4, showing a modified form of the present invention in which the hand lever controls only the mandrel clutch and indexing device, Figure 7 being a section taken along the line 7—7 of Figure 8;

Figure 8 is a section taken along the line 8—8 of Figure 7;

Figure 9 is a side view, taken at a reduced scale, of the control unit shown in Figures 7 and 8;

Figure 10 is a modified form of the present invention showing remotely actuated means for making an index on a correction slip; and Figures 11 and 12 are sections taken generally along the lines 11—11 and 12—12 of Figure 10.

Referring now more particularly to Figure 1, the reference numeral 10 indicates a dictation recording machine which includes a casing 11 carrying the motor and other operating parts. A mandrel 12 is mounted for rotation on the machine in a suitable manner and is adapted to carry a wax cylinder 13 on which dictation is recorded.

The recording unit is indicated in its entirety by the reference numeral 17 and includes a carriage 18 mounted for sliding movement on a supporting sleeve 19 and a guide rod 20 fixed to the casing. The carriage 18 is of conventional construction, embodying a recording stylus 22 carried on a diaphragm that is fixed to a head 24. The latter is connected in suitable manner to a voice tube, indicated in its entirety by the reference numeral 26, and is movable with the carriage 18 into and out of recording and reproducing positions. When in the recording position, the stylus 22 rides on the surface of the cylinder 13 and, when in reproducing position, the head 24 is so disposed that a reproducing stylus 28 is positioned to engage the surface of the cylinder 13. The diaphragm head 24 is movable from one position to another by a small lever 30 which is pivotally mounted on the carriage for movement about an axis, indicated at 31, on a yoke 32 which forms a part of the carriage 18, the lower end of the yoke embracing the guide rod 20.

When the lever 30 is moved into either its recording or reproducing position a small feed nut 200 (Figure 1A) on the carriage is moved into engagement with a feed screw 34 whereby, when the mandrel 12 is driven, the carriage 18 is advanced along the cylinder 13. The lever 30 is also movable into an intermediate position in which the head 24 is shifted to raise both styli 22 and 28 off the cylinder 13, as shown, and at the same time the feed nut is disengaged from the feed screw 34. This permits the recording unit 17 to be moved freely to any position along the cylinder 13. Further, the recording unit 17 also includes suitable mechanism whereby movement of the lever 30 into its forward or recording position automatically advances the unit 17, and movement of the lever 30 from an intermediate position into its listening or reproducing position automatically back-spaces the unit 17 a predetermined distance. Starting and stopping of the mandrel 12 is effected by suitable clutch mechanism (not shown) that is actuated by a Bowden wire 36 which is carried by the voice tube, as will be referred to later.

The particular details per se of the recording unit 17, including the sound box having the styli, the clutch mechanism, and advancing and back-spacing mechanism are conventional, and no claims are here made to such old and well known details. In order, however, to complete the present disclosure, reference is to be had to Figures 1A and 1B, and to the following United States Letters Patents: T. H. Macdonald, 934,451; T. H. Beard et al. 1,989,783; 2,071,278, and 2,117,236. The Macdonald patent shows the mechanism conventionally employed for reengaging the feed nut with the feed screw after a disengagement. The other patents show mechanism for engaging and disengaging the mandrel clutch and other controlling means.

Briefly, referring to Figures 1A and 1B, the lever 30 is connected by the shaft 31 to an arm 201, and the latter is connected by a link 202 to a ring lever 203 that is pivotally mounted on the carriage sleeve or rod 19. The lower end of the ring lever 203 has a cam 205 which engages a cooperating surface 206 on the feed nut 200 to move the feed nut down and out of engagement with the feed screw 34. The lever 30 is disposable in a forward position for recording, a rearward position for listening, and an intermediate or neutral position. In the latter position the cam 205 on the ring lever 203 engages the cooperating feed nut surface 206 and forces the feed nut 200 out of engagement with the feed screw.

The feed nut 200 is mounted in the yoke member 32 not only for movement toward and away from the feed screw 34 but also for movement laterally of the carriage. The latter carries a spring-biased plunger 211 and a stop member 212 disposed in the yoke 11 on opposite sides of the feed nut 200. A spring-actuated plunger 213 presses against the lower end of the feed nut stem 214 and urges the feed nut upwardly into engagement with the threads of the feed screw 34 unless the ring lever cam 205 forces the feed nut away from the feed screw.

The lateral movement of the feed nut 200 is controlled by a cam surface 215 on the ring lever 203 that engages a stud 216 on the side of the feed nut. When the lever 30 is moved forwardly toward recording position the ring lever is swung in a clockwise direction (Fig. 1A). This movement first causes the cam 205 to ride off the feed nut 200, and the latter then is moved upwardly by the spring plunger 213, but in so doing the spring plunger 211 forces the feed nut 200 to one side just before the feed nut threads engage the threads of the feed screw. As the ring lever 203 moves clockwise (Fig. 1A) the cam 215 engages the stud 216 on the feed nut and forces the latter into a vertical position. Since the latter is in engagement with the feed screw, the reaction of such movement advances the carriage. Thus, whenever the lever 30 is moved from neutral position to recording position the sound box carriage is advanced and the feed nut reengaged with the feed screw.

Figure 1B shows the back-spacing mechanism. A bracket 225 is fixed to the rear edge of the ring lever 203 and has a lug 226 engageable with a lever 228 having a slot 229 by which the lever is mounted for both vertical and pivotal movement on a screw 231. The lever 228 has a cam surface 232 and a pointed lower end 233, the latter being held by a spring 234 just out of contact with teeth 237 on a bar 238 fixed to the machine base. The spring 234 also holds the cam 232 against the ring lever lug 226.

When the lever 30 is moved rearwardly to listening position, the ring lever is rocked in a counterclockwise direction (Figure 1A). This forces the lug 226 downwardly, which carries with it the lever 228. When the pointed end engages in one of the serrations 237 the downward movement of the lever 228 is arrested, whereupon the continued downward movement of the lug 226 acts against the cam surface 232 and rocks the lever 228 clockwise (Figure 1B), which reacts against the carriage to shift it backwardly. Thus, whenever the lever 30 is rocked into its listening position, the carriage is automatically back-spaced.

Referring again to Figure 1, we provide indexing means which, according to the principles of the present invention, includes a punch 40 carried on an arm 41 which is pivoted to a support 42, the latter being fixed as at 43 and 44 to the carriage 18. The punch 40, when actuated, makes an index in a slip 45 carried on a suitable support 46 fixed to the casing 11 of the machine. Since the punch 40 is carried by the recording unit 17 while the slips 45 (usually in the form of a pad), are carried on the casing 11, the punch 40 rides along the slip 45 in the same relation that the stylus moves along the cylinder 13 during the recording of dictation. Thus, corrections and the like can be indicated on the slip 45 at the proper point thereon merely by actuating the punch 40. The punch 40, like the mandrel clutch mentioned above, is under the control of, or actuated by, a Bowden wire indicated in its entirety by the reference numeral 47.

As mentioned above, one of the principal features of this invention is the provision of what might be termed a unitary control mounted on the outer or handle end of the voice tube for affording a combined control of the indexing means, stopping and starting of the mandrel, the advancing and/or back-spacing of the carriage, and the positioning of the recording and reproducing styli. Such unitary control will now be described.

Referring now more particularly to Figures 1 and 2, the outer end of the voice tube 26 carries a tubular member 50 which, at one end, is fastened in any suitable manner, preferably adjustably, to a threaded sleeve 51 and at the other end receives a mouthpiece 52. The tubular member 50 which forms the handle of the voice tube is provided with a small tubular extension 53 disposed at a suitable angle to the axis of the member 50 and threaded at its outer end to receive a collar 54 which serves to hold an anchoring sleeve 55 in place. The inner cable of the Bowden wire 36 is fixed in any suitable manner to the anchoring sleeve 55 and the outer coiled sheath 57 is fixed to a plunger 58 which is slidable in the collar 54 and the anchoring sleeve 55. A flanged push button 59 is fixed to the outer end of the plunger 58. By depressing the plunger 58 the mandrel 12 and feed screw 34 are engaged with the driving mechanism, and by releasing the plunger 58, suitable spring means serves to disengage these parts from the driving mechanism.

The handle tube 50 is provided with a pair of oppositely disposed openings 60 and 61, and a generally U-shaped strap 62 is adapted to be placed about the tube 50 and serve as a supporting bracket for the pivoted element to be described below. The strap or bracket 62 may be fastened to the tubular member 50 in any suitable manner, as by a set screw 63 (Fig. 1). The strap or bracket 62 is slightly wider than the length of either of the openings 60 and 61, so that when the strap is in place one of the openings is covered by it. Each of the ends of the strap 62 is formed with a slot 64 therein to receive a shaft 65 disposed therein transversely of the tube 50. The shaft 65 is carried by a U-shaped yoke or lever 66, preferably in fixed relation, and the outer ends 67 of the yoke are turned laterally inwardly and threaded at 68 to receive screws 69 (see Fig. 3) to fasten a curved hand grip 70 to the element 66.

The U-shaped yoke or lever 66 extends through the opening 60 in the tube 50 and its intermediate portion is formed with an enlarged opening 71 therein through which the upturned end 72 of a Bowden wire plunger 73 extends. The plunger 73 forms a part of a Bowden wire indicated in its entirety by the reference numeral 75. The outer sheath 76 of the Bowden wire 75 is fixed to the plunger 73 and the inner cable of the Bowden wire 75 is fixed to a sleeve 77 that is anchored to the member 50 in any suitable manner, as by a clip 78 fastened by a screw 79 (Fig. 3) to the member 50. A hook 80 (Figs. 1, 2 and 3), secured in any suitable manner to the tube 50, aids the dictator in holding the voice tube while operating the members 59 and 70.

As will be seen from Figures 3, 5 and 6, the hand grip 70 and lever 66 may be swung in either direction from their intermediate position, shown in full lines in Figure 3. Moving the hand grip 70 in a clockwise direction, as viewed in Figure 3, shifts the plunger 73 to the left, and movement of the hand grip 70 in the other direction from its full line position shifts the plunger 73 to the right.

According to this invention, this movement is made use of in controlling the lever 30 on the carriage 18, as best shown in Figure 1. To this end, the outer coiled sheath 76 of the Bowden wire 75 is fixed to a plunger 81 which is slidable in an anchoring sleeve 82 on the carriage 18, to which the end of the inner Bowden wire cable is fixed. A suitable clip 83 serves to hold the sleeve 82 in fixed position on the carriage 18. Thus, swinging the handle lever 66—70 about its pivot 65 in a clockwise direction as viewed in Figure 1, and counterclockwise as viewed in Figure 3, acts through the Bowden wire to move the lever 30 on the carriage 18 in a counterclockwise direction (Fig. 1), engaging the carriage feed nut with the feed screw 34, lowering the diaphragm, with the recording stylus 22, into contact with the cylinder 13 and slightly advancing the carriage 18. Movement of the hand lever 66—70 back to its intermediate or neutral position disengages the feed nut from the feed screw 34 and raises the recording stylus 22 out of engagement with the cylinder 13. Movement of the handle lever 66—70 in a counterclockwise direction from its intermediate position, as viewed in Figure 1, and clockwise as viewed in Figure 3, acts through the Bowden wire 75 to swing the lever 30 in a clockwise direction, which shifts the diaphragm head downwardly to bring the reproducing stylus 28 into engagement with the wax cylinder 13, again engaging the feed nut with the feed screw 34 and, at the same time, back-spacing the carriage 18 a small amount.

Thus, by proper manipulation of the handle lever 66, 70 the shiftable diaphragm head of the recording unit can be disposed either in recording or reproducing position, or in an intermediate position. Further, by repeatedly swinging the hand lever 66, 70 in one direction or the other from its intermediate position, the carriage can be advanced or back spaced as desired.

The handle lever 66, 70 is also arranged for bodily shifting or transitional movement toward the tubular member 50. As best shown in Fig. 3, a spring 91 has its ends curved, as at 92 (Fig. 2), to bear against the member 50, and its intermediate portion 94 formed to engage underneath the shaft 65, the outer ends of which extend into the slots 64. Preferably, a portion of the shaft 65 is milled off, as at 95 (Fig. 4), to receive the spring, so that the latter, when in position, holds the shaft in place. The spring 91 biases the handle lever 66, 70 so as to hold the shaft 65 at the outer ends of the slots 64, 64 but the dictator may grasp the handle lever 66, 70 and depress the same bodily inwardly until the ends of the shaft 65 rest in the inner ends of the slots 64.

A generally U-shaped lever 96 is mounted for swinging movement on a pair of pins 97 that are carried by the bracket 62. The ends of the lever 96 are apertured (Fig. 2) to receive the pivot pins 97 and the ends of the lever 96 are offset, as at 98, and extended as at 101 and 102, to form arms which also extend through the opening 60 into the tube 50 and are disposed alongside the adjacent portions of the lever 66 and underneath the shaft 65. Thus, when the handle lever 66, 70 is forced bodily inwardly against the tension of the spring 91, the corresponding movement of the shaft 65 acts against the arms 101 and 102 and swings the lever 96 in a clockwise direction as viewed in Figure 3. The intermediate portion 105 of the lever 96 is disposed against the outer end of a Bowden wire plunger 107 which is slidably disposed in an anchoring sleeve 108 fixed to the member 50 by a clip 109 at a point opposite the anchoring sleeve 77 of the Bowden wire 75. The anchoring sleeve 108 forms a part of the Bowden wire 47 which actuates the indexing punch 40, and the parts are so arranged that when the handle lever 66, 70 is forced directly inwardly, the resulting pivotal movement of the lever 96 acts through the Bowden wire 47 to punch an index opening in the slip 45, at a point therealong corresponding to the position of the carriage 18 along the cylinder 13.

If desired, a small plate 110 may be fastened over the opening 60 or 61, after the control lever 66, 69 and associated parts are in place. Preferably, as indicated in Figures 3 and 4, this plate may take the form of an elongated member which is held in place by the spring 91. For purpose of clarity in illustrating other parts, the plate 110 has been omitted from the other figures.

As shown in the drawings, the hand-held lever 66, 70 is arranged to be operated by the left hand of the dictator. Thus the hand grip 70 is in such a position relative to the clutch control button 59 that when the dictator grasps the mouthpiece end of the voice tube, with the first two fingers at one end of the hand grip 70 and the other two fingers at the other end, the thumb of the left hand will be in a position to actuate the clutch button 59 easily and conveniently. Also, the hook 80 will engage the hand of the dictator and aid in the proper support of the mouthpiece end of the voice tube.

It is a simple matter to rearrange the unitary control of the present invention for either right hand or left hand operation. It will be seen from Figures 3 and 4 that the Bowden wire anchoring sleeves 77 and 108 are, like the openings 60 and 61 of the tubular member, directly opposite one another. This construction permits the handle lever 66, 70 and associated parts to be arranged at either side of the member 50 relative to the hook 80 and the clutch controlling button 59, and therefore permits arrangement of the handle lever 66, 70 for either right or left-hand operation without requiring any additional or substitute parts. For example, if it is desired to arrange the parts for right-hand operation, it is only necessary, first, to detach the spring 91, removing the Bowden wire, if necessary, whereupon the shaft 65 can be removed and the handle lever 66, 70 lifted out of the opening 60. Next, the pins 97 can be unscrewed and the lever 96 lifted out. Lastly, by removing the screw 63, the bracket 62 may be turned through a half-revolution, covering the opening 60 shown exposed in the drawings, and exposing the opposite opening 61, or the bracket may be entirely removed, temporarily, if desired. When the other opening 61 is exposed, the anchoring sleeves 77 and 108 of the Bowden wires 47 and 76, respectively, may be reversed by loosening or detaching the clips 78 and 109. After this is done, and the strap bracket 62 placed in its new position, the lever 96 can be replaced. Next, the handle lever 66, 70 may be inserted, at the same time placing the spring 91 in proper position and then, by depressing the latter slightly, the shaft 65 can be inserted and held locked in place by the spring 91.

In some cases where it may not be desired to control the recording and listening styli by means on the voice tube, an operating handle may be provided in which a movement of the handle in one direction controls the clutch to the mandrel, and a movement in the other direction controls the indexing device, thus eliminating the mandrel clutch button from the voice tube handle.

Referring now to Figures 7 to 9, the voice tube 50a is provided with a narrow slot 120 through which a lever 121 extends. The lever 121 consists of two parts 122 and 123, having upper and laterally directed sections 125 and 126 and ends 127 and 128 which are threaded to receive screws 130 by which an operating handle 132 is secured to the lever 121. A strap or bracket 135 encircles the voice tube 50a and has ends 136 and 137 which receive pintles 139 and 141 that extend into the sections 125 and 126 of the lever 121, thereby defining the pivot axis of the latter.

The lower end of the lever 121 lies between the inner ends of two Bowden wires 36a and 47a which control, respectively, the mandrel clutch and the indexing punch 40, or a similar device for making a notation of changes, corrections or the like. The Bowden wire 36a includes a plunger 151 slidably disposed within a mounting sleeve 152 that is secured to the voice tube by a clip 153 and a screw 154. A plate 155 is fixed to the outer end of the plunger 151 and lies in the path of movement of the lever 121 whereby when the lever is swung in a clockwise direction (Figure 9), the plunger 151 is shifted to the left (Figure 8) which engages the clutch and drives the mandrel.

The punch is actuated by a movement of the lever 121 in the other direction. The Bowden wire 47a includes a plunger 161 slidable in an anchoring sleeve 162 that is held in place in the voice tube 50a by a clip 163 and a screw 164. The outer end of the plunger 161 carries a plate 165 disposed in the path of movement of the lever 121 whereby, when it is swung in a counter-clockwise direction (Fig. 9), the plunger 161 is shifted to the right (Fig. 8) which actuates the punch 40.

A modified form of the present invention is shown in Figures 10, 11 and 12. Referring now to these figures, starting and stopping of the mandrel 12 and cylinder 13 is controlled conventionally by a Bowden wire 309, actuated by a push button 310 mounted in any suitable position on the handle of the speaking tube 305. According to the present invention, a second push button 311 is mounted on the speaking tube 305 in any suitable position, preferably adjacent the push button 310, where the dictator will have to release the running clutch button 310 before operating the button 311. This button 311 is connected with a second Bowden wire 312 (Figures 10 and 11) to operate a plunger 313 (Figure 12) mounted for reciprocation in a tubular support 314 that is fastened in any suitable manner to an indicator slip receiving member 315. The member 315 is provided with a slot 316 in which the indicator slip 317 may be disposed, as will be pointed out below, and the lower arm 318 of the member 315 has an opening 320 in axial alignment with the punch or plunger 313 normally held in retracted position within the tubular support 314 by a spring 322, but which may be actuated by the push button 311 and Bowden wire 312 to punch a hole in the indicator slip 317. The indicator slip 317 is adapted to be supported in fixed position on the recording machine 10 by any suitable means, such as a metal plate 325 fixed to the frame of the machine and provided with a clip 326 which holds the slip 317, or a pad of such slips, in position.

The indexing unit, which is indicated in its entirety by the reference numeral 330, and which includes the punch 313 and associated parts, is supported in a position to embrace one of the slips 317 and to move therealong with the recording unit 304 as the latter is advanced along the wax cylinder 13. For this purpose an arm 331 is fixed, as by screws 332, to the recording unit 304 and extends downwardly and forwardly toward the indicator slip support 325. At its lower end the arm 331 has a pair of ears 334 that are apertured to receive a hinge pin 335 or the like by which the member 315 is pivotally connected to the arm 331 at the lower end thereof. The arm 331 carries suitable stop means 336 which prevents the indexing unit 330 from swinging downwardly about the hinge 335 very far beyond the position shown in Figure 10, but the unit may be swung upwardly so as to facilitate the disposal of a pad of indicator slips 317 in position on the support 325. The stop 336 may be arranged to permit the member 315 to ride along on top of the pad of index slips 317.

The operation of the indexing unit 330 is believed to be clear from the above description. Before dictating on the cylinder 13, the dictator will dispose an indicator slip 317 in the slot 316, as indicated in Figure 10. As the recording unit is advanced along the cylinder 13 by the feed screw of the machine 10, the indexing unit 330 will, at the same time, be advanced along the indicator slip 317. At any point that the dictator desires to make an indication of a correction, insertion, or the like, all he has to do is to depress the indexing push button 311. The button 311 is disposed adjacent the conventional push button 310 which controls the clutch of the recording machine 10, and preferably the button 311 is placed close enough to the button 310 so that it can be operated by the same thumb or finger as used by the dictator to operate the button 310, but the spacing between the buttons 310 and 311, according to the principles of the present invention, is such that it will be necessary for the dictator to release the button 310, thereby stopping the forward travel of the recording unit 304 before depressing the index button 311. Pressing on the button 311 will project the punch or plunger 313 through the slip 317, forming a notch or hole 340 at a point corresponding approximately to the point on the wax cylinder 13 at which the desired change or correction is to be made. After the dictator has made the desired index on the slip 317 he will release the button 311 and can then resume dictation by depressing the button 310 in the usual manner.

Optionally, the hole punched by the part 313 might be in the nature of a slit, say arranged longitudinally of the slip 317, in which case it would not be necessary to stop the recorder to make an index, and the button 311 may be placed in any convenient location.

To make an indication on the slip 317 in the above manner does not require the dictator to alter his position, or perform any act that would tend to interrupt his trend of thought, and since the button 311 can be operated quickly, easily and conveniently, there is no appreciable loss of time or interruption of the flow of dictation.

We do not intend to be limited to the precise details shown and described, as the embodiments herein disclosed for purposes of illustration are obviously susceptible of wide variation in structure and application.

We claim as our invention:

1. In a recording machine adapted to make sound recordings on a record and having a voice tube and means to receive a pad of index slips, the combination of mechanism on said machine for supporting the uppermost slip of said pad in separated relation with respect to the other slips thereof and for perforating said uppermost slip to form an indexed control record, and means on said voice tube in a position to be actuated by the speaker talking into said voice tube for operating said perforating mechanism.

2. The combination of claim 1 wherein the recording machine includes a movable recording unit and the perforating mechanism consists of an arm carried by said unit and a punch mechanism movably connected to said arm so as to accommodate placing a pad of slips on the pad supporting means and to receive and maintain the uppermost slip of said pad in position to be indexed until all of said slips have been successively operated upon.

3. The combination of claim 1 wherein the recording machine includes a movable recording unit and the perforating mechanism consists of means movable with said unit, a slotted member movably connected with said means, the slot in said member being adapted to receive the uppermost index slip, and punch means carried by the upper portion of said member and positioned over the index slip in said slot.

4. For use with dictation recording machines having a movable sound box carriage, a voice tube connected at one end with said sound box carriage, and mechanism movable in one direction from an intermediate position for advancing said carriage and movable from said intermediate position in the other direction for back-spacing said carriage, control means comprising a member movably mounted adjacent the other end of said voice tube and movable in opposite directions from an intermediate position, and connections between said member and said mechanism whereby movement of said member in one direction from an intermediate position shifts said mechanism in said one direction to advance said carriage and movement of said member from said intermediate position in the other direction shifts said mechanism in said other direction for back-spacing said carriage.

5. For use with a dictation recording machine having an indexing device, a movable sound box, a voice tube connected therewith, and a lever carried by said sound box and movable from an intermediate position into listening and recording positions, control means comprising a manually controlled member mounted for pivotal and shifting movements on said voice tube, means connecting said lever with said manually controlled member whereby pivotal movement of the latter shifts said lever into and out of its listening and recording positions, and means connecting said indexing device with said manually controlled member whereby shifting movement of the latter actuates said indexing device.

6. A remote control device for dictation recording machines having a generally cylindrical voice tube and movable controlling parts, said control device comprising a support carried by said voice tube and including spaced parts extending generally transversely of the voice tube, an elongated member mounted on said spaced parts generally longitudinally of said voice tube for angular movement about an axis with respect to said support and for bodily movement substantially directly toward said support, and means connected with said elongated member and said controlling parts whereby the latter are moved by the angular and bodily movements of said member.

7. A remote control device for dictation recording machines having a generally cylindrical voice tube and a movable controlling part, said control device comprising a support adapted to be attached to said voice tube and including a pair of sections extending generally outwardly from said tube in spaced apart relation, a handle extending generally longitudinally of said voice tube and having opposite ends formed so that the handle may be swung in either direction toward the voice tube, pivot means connecting said handle to said sections for pivotal movement about an axis generally transversely of the longitudinal axis of the voice tube, and means adapted to connect said handle with said controlling part.

8. A control device as defined in claim 7, further characterized by said pair of supporting sections being slotted generally transversely of the voice tube, said pivot means being disposed in the slots of said sections, spring means acting to hold said pivot means at the outer ends of said slots, and connecting means actuated by movement of the handle pivot means in said slots for actuating said controlling part.

9. The combination with a voice tube for a recording machine, said tube having a slot therein, of supporting means carried by said voice tube on opposite sides of said slot, a handle pivotally mounted on said supporting means for swinging movement about an axis extending generally transversely of the voice tube generally between the latter and the handle, whereby the handle is swingable toward and away from the voice tube, and an operating arm fixed to said handle and extending through said slot between said supporting means into said voice tube.

10. A remote control device for a dictation recording machine having a voice tube adapted to be held in one hand, said control device comprising a first member mounted on the voice tube and movable in at least two different directions, connections whereby said member is adapted to control at least two operative functions of the recording machine, a second member mounted on said voice tube adjacent said first member, and connections whereby said second member is adapted to control another operative function of said machine, said second member being mounted on said voice tube in a position spaced both circumferentially and axially from said first member so that the second member is adapted to be actuated by the thumb and the first member by the fingers of the one hand holding said voice tube.

11. A remote control device for a dictation recording machine having a voice tube adapted to be held in one hand, said control device comprising a first member mounted on the voice tube and movable in at least one direction, connections whereby said member is adapted to control at least one operative function of the recording machine, a second member mounted on said voice tube adjacent said first member, and connections whereby said second member is adapted to control another operative function of said machine, said second member being mounted on said voice tube in a position spaced both circumferentially and axially from said first member so that the second member is adapted to be actuated by the thumb and the first member by the fingers of the one hand holding said voice tube, said first member including a part extending along the tube and formed to receive the fingers.

12. In a dictation machine having a clutch lever and index forming means, a voice tube having a slot, a handle mounted on the voice tube for pivotal movement about an axis adjacent one side of the voice tube, an arm fixed to said handle to pivot therewith about said axis, said arm extending through said slot to a point adjacent the other side of the tube, and a pair of Bowden wires operatively connected with said arm, one extending to the clutch lever of the dictation machine and the other to index forming means on said dictation machine.

13. In a dictation machine, a voice tube having a slot, a manually controlled arm pivoted on a handle at one side thereof and extending through said slot to a point adjacent the other side of the voice tube, a Bowden wire having an anchoring sleeve and an operating part movable longitudinally of the sleeve, means connecting said part with the inner end of said arm, and means serving as a clip detachably fixing said sleeve within said tube at said other side thereof.

14. In a dictation machine having a voice tube, a slotted handle support thereon, a handle mounted on said support and having a part movable in the slotted portion of said support, a lever pivoted adjacent the slotted support and operated by movement of said part in the slotted portion of said handle support, and controlling means actuated by said lever.

15. The combination with a recording machine having a rotatable mandrel and clutch means for engagement and disengagement with driving means for said mandrel, a sound box assembly movable in either of two directions on a fixed guide rod, said assembly including means movable in either of two directions from an intermediate position for advancing and retracting said sound box assembly along said guide rod and simultaneously positioning the recording and reproducing styli, and a voice tube connected at one end with said sound box assembly, of unitary control means comprising an operating arm adjacent the other end of said voice tube, said arm extending at least partially into the interior of said voice tube, means supporting the arm on the voice tube whereby said arm is movable in either of three directions from an intermediate position, and connecting mechanisms extending from the inner end of said arm to said advancing and retracting means and to said clutch means, whereby said connecting mechanisms are actuated by selective movements of said arm for moving said sound box assembly in either direction along said guide rod and for operating said clutch means.

16. A remote control device for dictation recording machines having a generally cylindrical voice tube, comprising a support adapted to be attached to said voice tube and including a pair of sections extending generally outwardly from said tube in laterally spaced apart relation, a handle extending generally longitudinally of said voice tube and having opposite ends so formed as to embrace, at least partially, the voice tube, thereby allowing the handle to be swung in either direction toward the voice tube through an appreciable range of angular movement, and pivot means connecting said handle to said laterally spaced sections for pivotal movement about an axis generally transversely of the longitudinal axis of the voice tube.

17. In a dictation recording machine having a voice tube adapted to be held in the hand of the dictator and a manual control carried by said voice tube, the combination of index receiving means on said machine, mechanism on said machine for making an index on said means, and index mechanism actuating means arranged so that said manual control is released to stop the recording machine before said indexing means is actuated.

18. For use with a recording machine having a recording unit, a voice tube connected at one end to said unit, and mechanism movable to effect two separate operative functions, control means comprising a lever pivotally mounted at the other end of said voice tube and having an end extending into the voice tube and movable relative thereto in different directions, an operating handle fixed to the outer end of said lever and extending along said tube in such position that both the voice tube and operating handle may be grasped in one hand, the axis of pivotal movement of said lever and handle being disposed relative to the voice tube so that either end of the handle may be moved closer to the voice tube while the other end moves away from the voice tube, and shiftable mechanical connecting means disposed at least partially within said voice tube and extending between the inner end of said lever and said movable recording machine mechanism, whereby movement of one end of the operating handle toward the voice tube acts through said lever and connections to actuate said mechanism to effect one of said operative functions and movement of the other end of said operating handle toward the voice tube likewise actuates said mechanism to effect the other of said operative functions.

19. Control means as defined in claim 18, further characterized by said shiftable connecting means including separate controlling parts within said voice tube adjacent the inner end of said lever, movement of one end of said operating handle toward said voice tube swinging said lever in one direction and shifting one of said connecting parts, and movement of the other end of said operating handle toward the voice tube serving to swing the lever in the other direction and shifting the other of said connecting parts.

20. For use with a recording machine having two separate movable controlling parts, a movable recording unit and a voice tube connected at one end to said unit, control means comprising a lever mounted for both pivotal movement and bodily movement toward said voice tube at the other end thereof, said lever having an end extending into said voice tube and movable relative thereto in different directions, an operating handle fixed to the outer end of said lever and extending along said voice tube in such position that both the voice tube and operating handle may be grasped in one hand, and shiftable mechanical connections disposed at least partially within said voice tube and extending between the inner end of said lever and said separate control parts, respectively, whereby movement of said lever in one direction actuates one of said parts and movement of said lever in a different direction actuates said other part, said shiftable mechanical connections including means actuated by bodily movement of said lever for actuating one of said separate controlling parts.

EUGENE P. GAILMARD.
ROGER C. JOHNSON.